United States Patent
Walker et al.

(10) Patent No.: US 6,190,256 B1
(45) Date of Patent: Feb. 20, 2001

(54) GAMING DEVICE AND METHOD OF OPERATION THEREOF

(75) Inventors: Jay S. Walker, Ridgefield; James A. Jorasch, Stamford; Magdalena Mik, Greenwich, all of CT (US)

(73) Assignee: Walker Digital, LLC, Stamford, CT (US)

( * ) Notice: Under 35 U.S.C. 154(b), the term of this patent shall be extended for 0 days.

(21) Appl. No.: 09/102,403

(22) Filed: Jun. 22, 1998

(51) Int. Cl.[7] .............................. A63F 9/24; G06F 17/60
(52) U.S. Cl. ................................. 463/25; 705/39
(58) Field of Search ..................... 463/1, 12–13, 463/16, 20, 25, 29, 40–42; 902/22–24; 700/91–93; 705/64, 72, 38, 39, 44

(56) References Cited

U.S. PATENT DOCUMENTS

| | | |
|---|---|---|
| 5,038,022 | 8/1991 | Lucero . |
| 5,265,874 | 11/1993 | Dickinson et al. . |
| 5,326,104 | 7/1994 | Pease et al. . |
| 5,457,306 | 10/1995 | Lucero . |
| 5,458,333 | 10/1995 | Takemoto et al. . |
| 5,470,079 | * 11/1995 | LeStrange et al. ..................... 463/25 |

OTHER PUBLICATIONS

PCT International Search Report for International Application No. PCT/US99/13905 mailed Jun. 27, 2000.

* cited by examiner

Primary Examiner—Mark A. Sager
(74) Attorney, Agent, or Firm—Dean Alderucci; Nathaniel Levin

(57) ABSTRACT

A gaming device and method of operation thereof are provided in which the gaming device receives a loan request, which includes a loan amount, to establish a balance without having received payment therefor. The device sends a request signal to a controller of the gaming device communicating the loan request, and a balance is established with the gaming device. The gaming device in turn receives an approval signal from the controller of the gaming device regarding approval of the loan request. The loan amount may be less than or equal to the requested amount. A cash-out mechanism of the gaming device is enabled in accordance with the approval signal before the approval signal is received.

27 Claims, 12 Drawing Sheets

| PLAYER IDENTIFIER 401 | ROOM NUMBER 402 | AMOUNT OF LOAN ISSUED 403 | AMOUNT OF LOAN REPAID 404 | AMOUNT OF LOAN DUE 405 | CREDIT CARD ACCOUNT NUMBER 406 |
|---|---|---|---|---|---|
| 12345678 | 1338 | $100 | $100 | $0 | 1111-2222-3333-4444 |
| 45678901 | N/A | $20 | $10 | $10 | 2222-3333-4444-5555 |
| 56789012 | N/A | $0 | $0 | $0 | 3333-4444-5555-6666 |

FIG. 4

| GUEST NAME 501 | PLAYER IDENTIFIER 401 | ROOM NUMBER 402 | AMOUNT OF LOAN ISSUED 403 | AMOUNT OF LOAN REPAID 404 | AMOUNT OF LOAN DUE 405 | CREDIT CARD ACCOUNT NUMBER 406 |
|---|---|---|---|---|---|---|
| JOE SMITH | 12345678 | 1338 | $100 | $100 | $0 | 1111-2222-3333-4444 |
| JANE DOE | 23456789 | 164 | $50 | $10 | $40 | 2222-3333-4444-5555 |
| JOHN JONES | 34567890 | 208 | $0 | $0 | $0 | 3333-4444-5555-6666 |

GAMING DEVICE AND METHOD OF OPERATION THEREOF

FIELD OF THE INVENTION

The present invention relates to amusement devices, and more specifically to electronic chance devices such as slot machines.

BACKGROUND OF THE INVENTION

Gaming devices such as slot machines, video poker machines and the like, can be highly profitable. However, if the prospective player encounters inconvenience or delay in beginning play on a slot machine, he may forego playing. For example, the prospective player may not have immediately available funds. Alternatively, he may have temporarily run out of funds, but would like to keep on playing.

The player may have currency on hand but in too large a denomination, thus forcing him to wait until he can make change. Even though some slot machines have bill validators that accept large-denomination bills, these bill validators cannot provide change in the form of small-denomination bills, such as breaking a $100 bill into five $20 bills. This inconvenience may prevent a player from initiating play if he does not want to insert the $100 bill into the slot machine to establish a balance and does not want to wait for an employee to come by and make change for him before he can start playing.

Accordingly, it is highly desirable to make it as easy as possible for a prospective player to begin playing a slot machine or to continue playing a slot machine after running out of money. Reduction or elimination of any inconvenience to initiating play would result in increased player time, particularly in instances where the decision to play (or to continue to play) is based on impulse. Increased player time and more players overall at slot machines result in an opportunity for increased revenue for the slot machine operator which is often a casino.

Casinos have used a number of methods to allow players to establish a balance without inserting currency into a slot machine. For example, some slot machines accept credit or debit cards as a means of establishing a balance.

U.S. Pat. No. 5,038,022 to Lucero describes a gaming device that accepts debit and credit cards in order to establish a balance at a gaming device. U.S. Pat. No. 5,457,306 to Lucero describes a system where a player can use a credit card at a slot machine to obtain funds in order to establish a balance. The financial institution that holds the account of the credit card is contacted and the request for funds is approved. The amount of requested credit is then credited to the casino and debited from the player's credit card account.

However, the use of credit cards is not appealing to many players, who may be wary of providing their card account number. In addition, a written record of the player's gambling session appears later on the player's credit card statement, which the player may prefer to avoid.

U.S. Pat. No. 5,458,333 to Takemoto describes a system that allows a player to play at a gaming device without first providing payment. Under this system, the player uses a "credit medium" that has a predetermined balance stored on it. The player may obtain the "credit medium" from a casino service counter and insert it into a gaming device that is equipped to accept and recognize it. The gaming device can read the stored balance recorded on the "credit medium," allow it to be used as payment for game play, and make adjustments to it based on the player's outcomes (i.e. subtract the player's wager amounts and add the player's winnings). At the end of game play, or when the player's balance is equal to zero, the player returns to the casino service counter to make payment (if the player's winnings were less than the original amount of stored balance) or receive his winnings (if the player's winnings were more than the amount of the original stored balance).

This system does not encourage a player to begin playing on impulse, because the player must first obtain the "credit medium" from the casino service counter before he can start playing. The system is inconvenient to the player at the end of game play as well, when he must return to the casino service counter to collect his winnings. This system also does not permit a player who does not have any cash on hand to initiate game play during his casino visit. Furthermore, providing the "credit medium" to the player is an added expense and inconvenience for the casino. Additionally, Takemoto involves securing exits of the gaming establishment to prevent players from leaving without repaying any losses recorded on the "credit medium".

U.S. Pat. No. 5,265,874 to Dickinson et al. describes a system where a player may provide an amount of money to the casino that is stored on the casino server in association with the player's identification number. This allows the amount of money the player has stored to be downloaded to any gaming device into which the player inserts his player tracking card. However, a player must have a previously-established account with the casino and must have sufficient funds in the account.

None of the above-mentioned systems allow an individual to establish a balance at a gaming device without providing payment contemporaneously therewith.

SUMMARY OF THE INVENTION

The present invention provides a system including a gaming device, such as a slot machine, where a player may establish a balance with the gaming device without providing payment. The player instead establishes a balance by receiving a "loan". The player may then begin playing with that balance. The loan has the effect of encouraging impulse play at the gaming device.

According to one aspect of the invention, a gaming device operation method is provided in which the device receives a loan request, which includes a loan amount, to establish a balance without having received payment therefor. The device sends a request signal to a controller of the gaming device communicating the credit request. The gaming device receives an approval signal from the controller of the gaming device regarding approval of the loan request, and establishes a balance, up to the loan amount. The loan amount may be less than the requested amount. A cash-out mechanism of the gaming device is enabled in accordance with the approval signal or other signal. The gaming device allows the player to begin playing with the established balance.

According to another aspect of our invention, a method is provided for approving a loan request for a player of a gaming device. A loan request signal is received from the gaming device.

The loan request includes the requested amount and a player identifier. The loan request is evaluated, and a signal is sent to the gaming device indicating approval or disapproval of the loan request. A signal indicating approval of the loan request includes a signal enabling a cash-out mechanism of the gaming device. The loan amount extended to the player is recorded.

A slot machine in accordance with the present invention may allow a player to establish a balance at the slot machine, without the player providing any payment. In one embodiment of the invention, the machine sends out a signal to the appropriate casino personnel at the time of a loan request. The balance is established and may be used by the player immediately, but may not be withdrawn by the player as currency ("cashed out") until casino personnel arrive to complete the loan application. A central processing unit (CPU) within the machine is capable of disabling the cash-out feature of the machine until casino personnel arrive to enable it and have the player sign a loan application.

BRIEF DESCRIPTION OF THE DRAWINGS

FIG. 4 shows in schematic form the structure of the transaction database.

FIG. 5 shows in schematic form the structure of the registered casino hotel guests database.

DETAILED DESCRIPTION OF THE PREFERRED EMBODIMENTS

Figure 1:
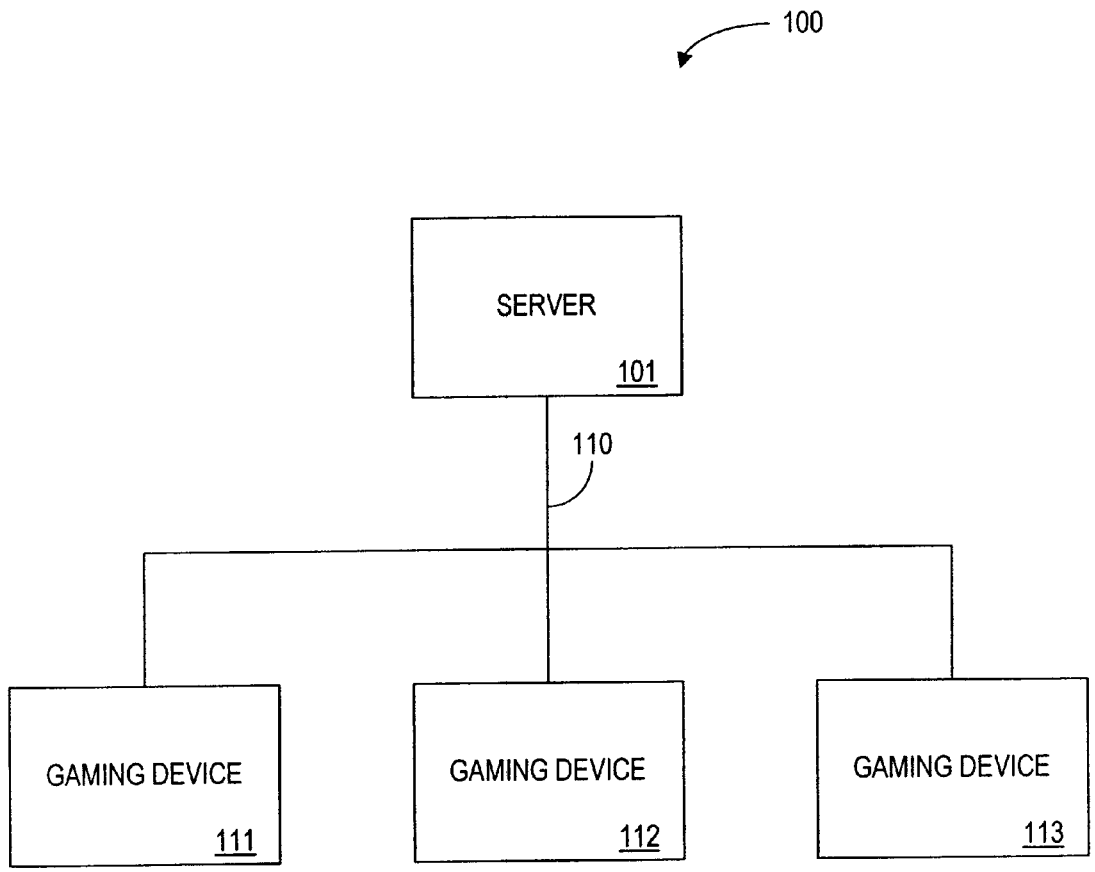
FIG. 1 is a block diagram of gaming devices connected to a server.

FIG. 1 shows a general view of a system 100 representing an embodiment of the present invention. In the illustrated system, gaming devices 111, 112 and 113 are connected to a casino server 101 by a communication link 110. The gaming devices 111, 112 and 113 use the link to the server 101 to send loan requests and receive approvals of those loan requests.

Figure 2:
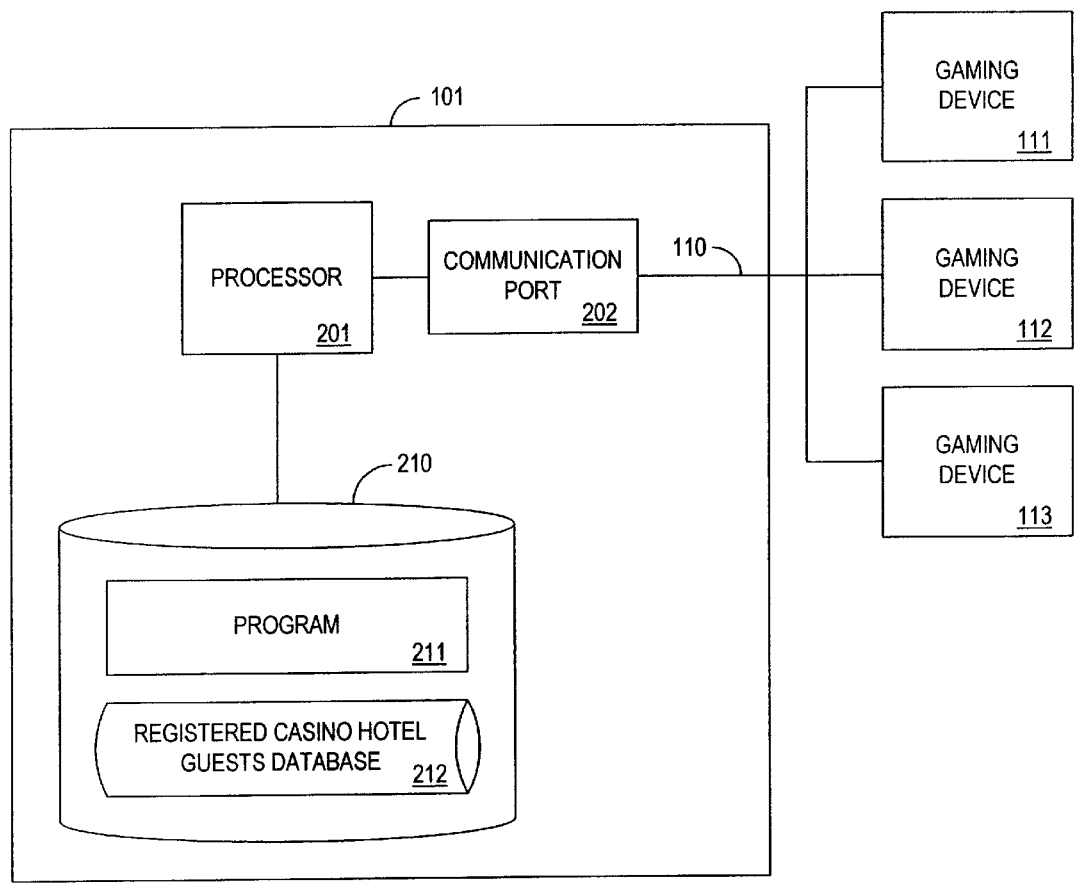
FIG. 2 is a block diagram showing details of the server depicted in FIG. 1.

FIG. 2 is a block diagram of the casino server 101. The casino server 101 includes a processor 201, with a communications port 202 and a data storage device 210 connected thereto. The communications port 202 is also connected to the communication link 110 to receive data signals, such as loan requests, from the gaming devices 111, 112 and 113 and to transmit signals, such as signals representing loan approvals, to the gaming devices 111, 112 and 113. The casino server 101 may thus act as a controller of one or more gaming devices. In other embodiments, some or all of the functions performed by the casino server 101 may be performed by a gaming device.

The communications port 202 may also be used to communicate with casino personnel, directing them to the gaming device at which a loan was requested. In one embodiment in which loan approval is performed automatically, communication port 202 may be used to communicate with casino personnel if the automatic loan approval is not successful. The communications port 202 may also be used to direct a gaming device to halt play if the player's loan request is denied. In an alternate embodiment of the present invention, the communications port 202 is also used to communicate with a financial institution (not shown) in order to verify the creditworthiness of the player (e.g. verify that the player has enough available credit on his credit card account to cover the requested amount).

The data storage device 210 contains a program 211 for execution by the processor 201 to operate in accordance with the present invention, and particularly in accordance with the methods described herein. For example, the processor 201 may perform the proper loan approval steps, such as checking whether the player is a registered casino hotel guest as would be apparent to those skilled in the art. The data storage device 210 also stores a registered casino hotel guests database 212 that stores guest information.

Figure 3:
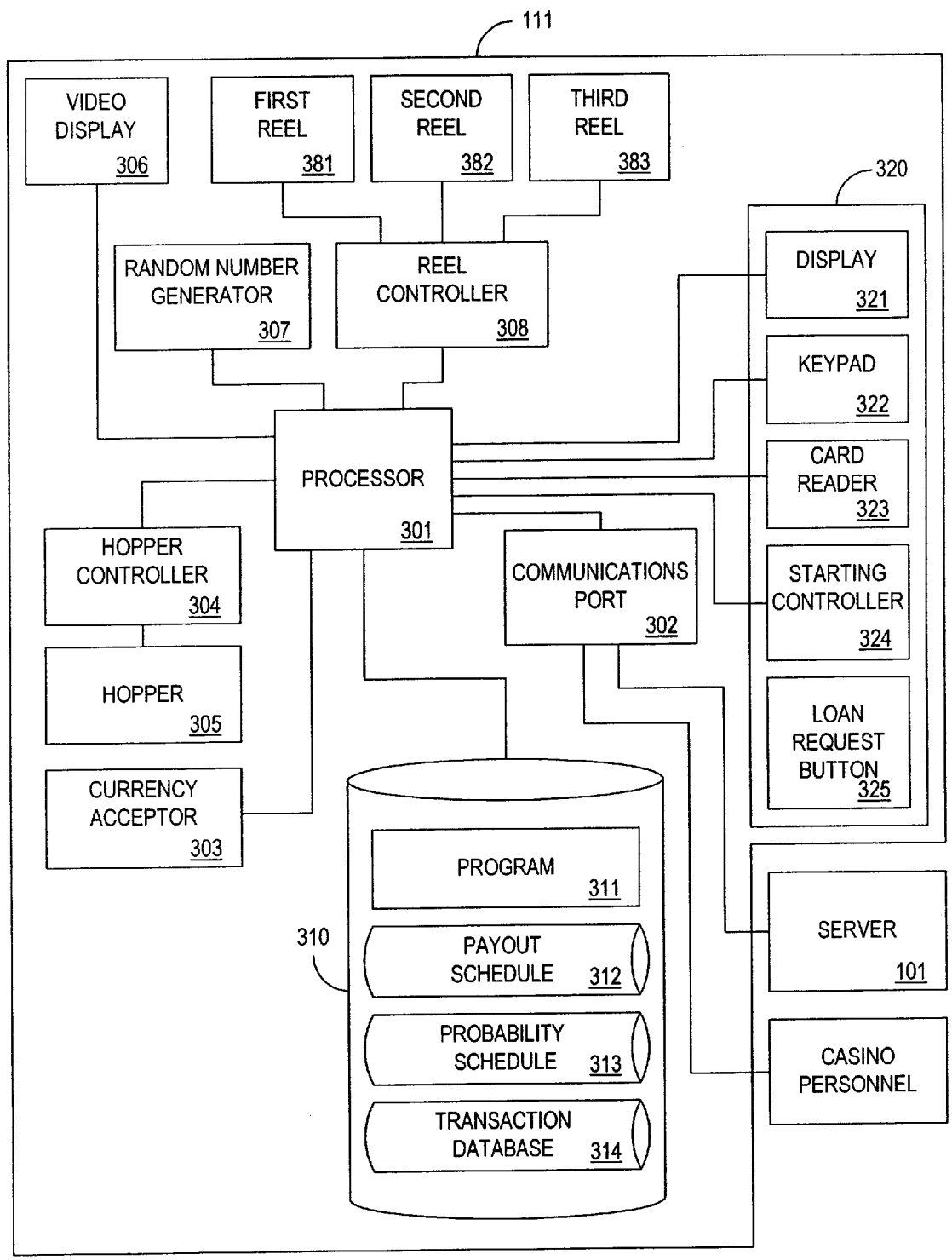
FIG. 3 is a block diagram of a slot machine according to an embodiment of the present invention.

FIG. 3 is a block diagram of the gaming device 111, a slot machine in this example, in accordance with the present invention. The gaming devices 112 and 113 may be similar or identical to the gaming device 111. The gaming device has a processor 301 connected to a communications port 302, a currency acceptor 303, a hopper controller 304, a video display 306, a random number generator 307, a reel controller 308, a data storage device 310, and various components of an interface section 320.

The communications port 302 of the slot machine is connected to the server 101 via the communication link 110. The communications port 302 of the slot machine may also be used to communicate with casino personnel to inform them of loan requests. This may be done by a variety of methods, such as calling the pertinent casino employee's cellular phone number; activating the employee's pager; transmitting an electronic signal to a computer terminal monitored by the employee; or alerting casino employees by flashing a light on the slot machine or playing an audible signal.

The data storage device 310 contains a program 311 to direct the processor 301 to operate in accordance with the present invention, and particularly in accordance with the methods described herein. The storage device 310 also contains a payout schedule 312, a probability schedule 313 and a transaction database 314, described in more detail below.

The slot machine processor 301 directs play of the slot machine by controlling the reel controller 308, in accordance with the output of the random number generator 307 and the stored payout and probability schedules 312 and 313 in a manner understood by those skilled in the art. The reel controller 308 controls reels 381, 382 and 383 of the slot machine 111. The result of play may be displayed on the video display 306 (e.g. for video poker machines) and/or the reels 381, 382 and 383 (e.g. for slot machines). The video display 306 may also be used to display other information, such as the balance of the gaming device 111. The balance indicates the funds available to the player for use in game play. Wager amounts are drawn from the balance, so a non-zero balance allows the player to continue wagering and playing. If the "cash out" feature of the gaming device 111 is enabled, the processor 301 may direct the hopper controller 304 to dispense coins or tokens from a hopper 305 into a payout tray (not shown).

A player communicates with the slot machine using the interface section 320. Instructions for the player may be displayed on a display device 321. The player may enter pertinent information by pressing keys on keypad 322, or alternatively by touching a screen on display device 321. The interface section 320 may also include a card reader 323 and a starting controller 324. The card reader 323 is operable to read player tracking cards inserted therein to determine information such as player identifiers stored on the cards. The starting controller 324, which the player operates to initiate play, is in communication with the processor 301. The starting controller 324 may be, for example, a handle pulled by the player or a button actuated by the player. Finally, the interface section 320 may include a "loan request" button 325 that the player presses to initiate a loan request.

FIG. 4 shows in tabular form the structure of the transaction database 314. The gaming device opens a new record in the transaction database 314 for every player submitting a loan request, or alternatively, for every player account, which may be shared by more than one player. Each record in the transaction database 314 has fields for a player identifier 401, a casino hotel room number 402, the amount of loan issued 403 to the player, the amount of loan repaid 404, the amount of loan due 405, and the player's credit card account number 406. The player identifier 401 may be a predetermined identifier, such as "00000000", for those players that do not provide a player identifier. Similarly, if the player has not identified himself as a guest at the casino hotel, the room number field 402 is "N/A," "0000" or the like. The amount of loan due 405 represents the difference between the amount of loan issued 403 and the amount of loan repaid 404. Accordingly, the amount of loan issued 403 is the sum of the amount of loan repaid 404 and the amount of loan due 405.

FIG. 5 shows in tabular form the structure of the registered hotel guests database 212 stored in the storage device 210 of the server 101. Each record in this database has the guest name 501, the player identifier 401 (corresponding to a player identifier stored in the transaction database 314), and the guest's room number 402. Each record also includes loan information 403, 404, 405 and 406 as in the transaction database 314.

Figure 6:
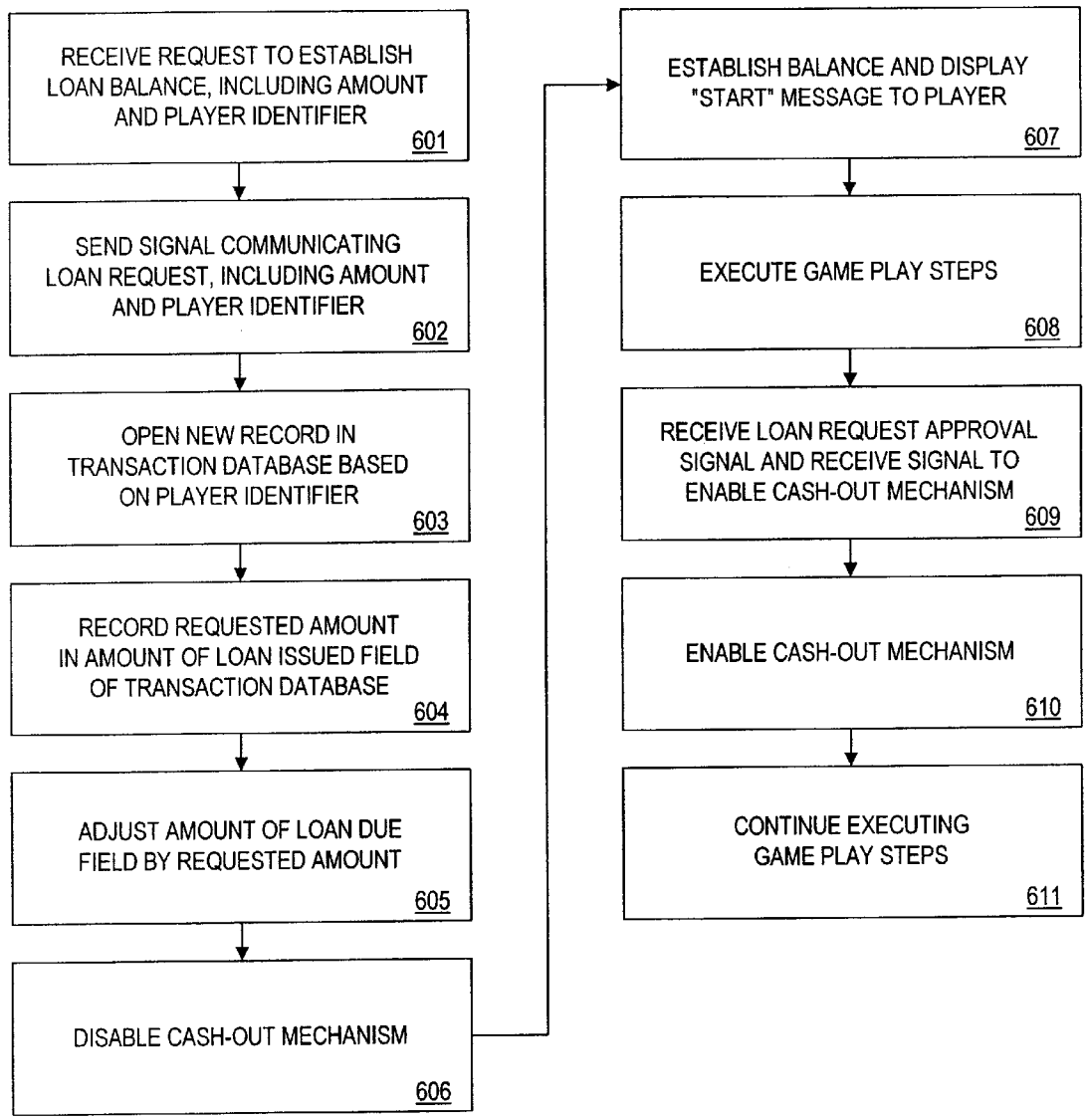
FIG. 6 is a flowchart showing a method for processing a player's loan request for establishing a balance at a gaming device.

FIG. 6 illustrates a process performed by the gaming device for establishing a balance without providing payment. In step 601 the device receives a request to establish a balance without payment. The request includes the requested amount and the player identifier 401 (FIG. 4). This request may be entered using a combination of devices in the interface section 320 (FIG. 3) described above. For example, the player may first press the "loan request" button 325 (FIG. 3), and then enter his identifier 401 (FIG. 4) and the requested amount using the keypad 322 (FIG. 3) when prompted to do so by a message on the display device 321 (FIG. 3).

At step 602, the gaming device sends a signal communicating the loan request, including the requested amount and the player identifier, to the server 101 (FIG. 1) over the communication link 110 (FIG. 1). The gaming device may also inform casino personnel (using an audio or visual signal, beeper, cellular phone, etc.) that a loan request has been made. At step 603, the processor 301 (FIG. 3) of the gaming device, executing the steps of the program 311 (FIG. 3), opens a new record in the transaction database 314 (FIGS. 3 and 4).

The loan amount may be equal to or less than the requested amount. For example, a player may submit a loan request for an exorbitant amount (e.g. $10,000) that the casino is not willing to approve. Accordingly, the loan amount may be determined, at least in part, by a predetermined threshold. For example, the casino may only approve loan requests that are not greater than $100. The loan amount may also be determined, at least in part, by past transactions of a player. For example, players that are frequently at the casino may be eligible for loan requests of up to $300, while other players are eligible for loan requests of up to $200. Data indicating the past transactions of the player may be stored in the registered hotel guests database 212 (FIGS. 2 and 5).

The loan amount is recorded in the corresponding amount of loan issued field 403 of the transaction database 314 (step 604), and added to the corresponding amount of loan due 405 (step 605).

In step 606, the cash-out mechanism of the gaming device is disabled, pending approval of the player's loan request. The gaming device then signals the player (for example, by a "Start" message on the display device 321) that play may begin, and a balance equal to the loan amount is established (step 607). It should be noted that at this point the player may begin playing, even though he has neither made payment nor given a credit card number nor had any interaction with casino personnel. If there had been a non-zero balance prior to the request to establish a balance, then the establishing of the balance comprises increasing the balance by the loan amount.

In another embodiment, a balance equal to the requested amount is established pending approval of the player's loan request. When the loan request is approved, but the loan amount is less than the requested amount, the balance is reduced by an amount equal to the difference between the requested amount and the amount of loan issued. For example, the player may request a loan amount of $1,000, and so a balance of $1000 is established. When the loan request is approved, and the loan amount is only $50, the balance of the gaming device is reduced by $950 ($1,000–$50=$950). Thus if the player had wagered and lost $5 before the loan request was approved, he would have had a balance of $995 ($1,000–$5=$995). After approval, the balance is reduced by $950, and thus the balance would be $45 ($995–$950=$45).

The gaming device executes game play steps (step 608) known to those skilled in the art, such as generating a random number, retrieving an outcome using the probability schedule 313, and retrieving any payout associated with the outcome from the payout schedule 312. The payout amount is added to the corresponding amount of loan repaid 404 and subtracted from the corresponding amount of loan due 405.

After a balance is established, the gaming device receives a signal indicating that the loan request has been approved (step 609). This signal may be inputted to the gaming device by casino personnel using a variety of possible methods, after the player has signed the appropriate paperwork. For example, a casino employee (alerted by the signal sent in step 602) may carry the paperwork to the player, and then enter an authorization code on the keypad 322. Alternatively, the casino employee may carry a card with a magnetic stripe, or a smart card with a chip, that he swipes through the card reader 323 in order to provide the authorization code indicating approval.

If the authorization code corresponds to one or more predetermined codes (i.e. valid codes) then the player's loan request is approved and the cash-out mechanism is enabled (step 610). The gaming device then continues to execute the game play steps (step 611) in a manner known to those skilled in the art.

Figure 7:
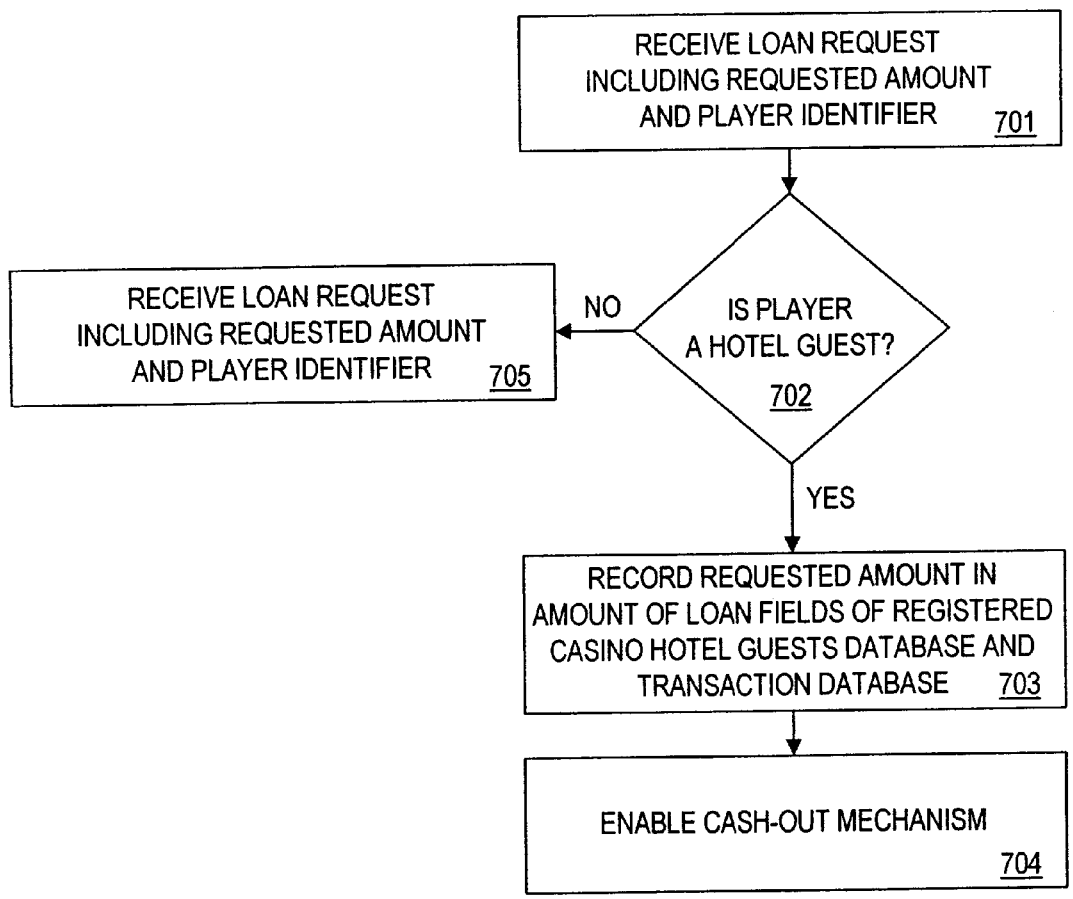
FIG. 7 is a flowchart showing a method for automatic handling of a loan request by the casino server according to another embodiment of the present invention.

In an alternate embodiment of the invention, the player may identify himself as a casino hotel guest, thereby reducing or eliminating the need for paperwork. The steps performed in this embodiment are shown in the flowchart in FIG. 7. In step 701, the gaming device receives a loan request as discussed above. The player identifier 401 is transmitted to the server 101 over the communication link 110. The processor 201 checks the player identifier 401 against the list of registered hotel guests in the guest database 212 (step 702).

If the player is listed in this database as a hotel guest, the server may direct the gaming device to prompt the player to enter a room number or PIN number on the keypad 322 for verification purposes, or perhaps to swipe a tracking card (which may be provided by the hotel at check-in time) through the card reader 323. If the verification confirms the player's registration at the hotel, then the server stores the requested amount in the amount of loan issued field 403 in the database 212 (step 703). The server then directs the gaming device to enable the cash-out mechanism (step 704), without any need for intervention by casino personnel.

If the player repays some or all of the amount of the loan at the end of the session, the amount repaid is also stored in the database 212 (FIG. 5) (i.e. added to the amount of loan repaid 404, and subtracted from the amount of loan due 405). Any remaining amount of loan due would be applied to the player's bill when he checks out of the hotel.

If the player is found not to be a hotel guest, the server instructs the gaming device to notify casino personnel to visit the player with the necessary paperwork as described above (step 705).

In addition, the server may direct the gaming device to halt play if the loan request is not automatically approved.

In another embodiment of the invention, the loan approval process is automated (that is, casino personnel need not be notified and need not have the player fill out a loan application) even if the player is not a guest at the casino hotel. The player would be required to input a credit card number, debit card number, bank account number, or the like to the gaming device as collateral before a loan request could be approved. This input could be performed in a number of ways, including entering an account number on the keypad 322 and/or swiping a card through the card reader 323.

Figure 8:
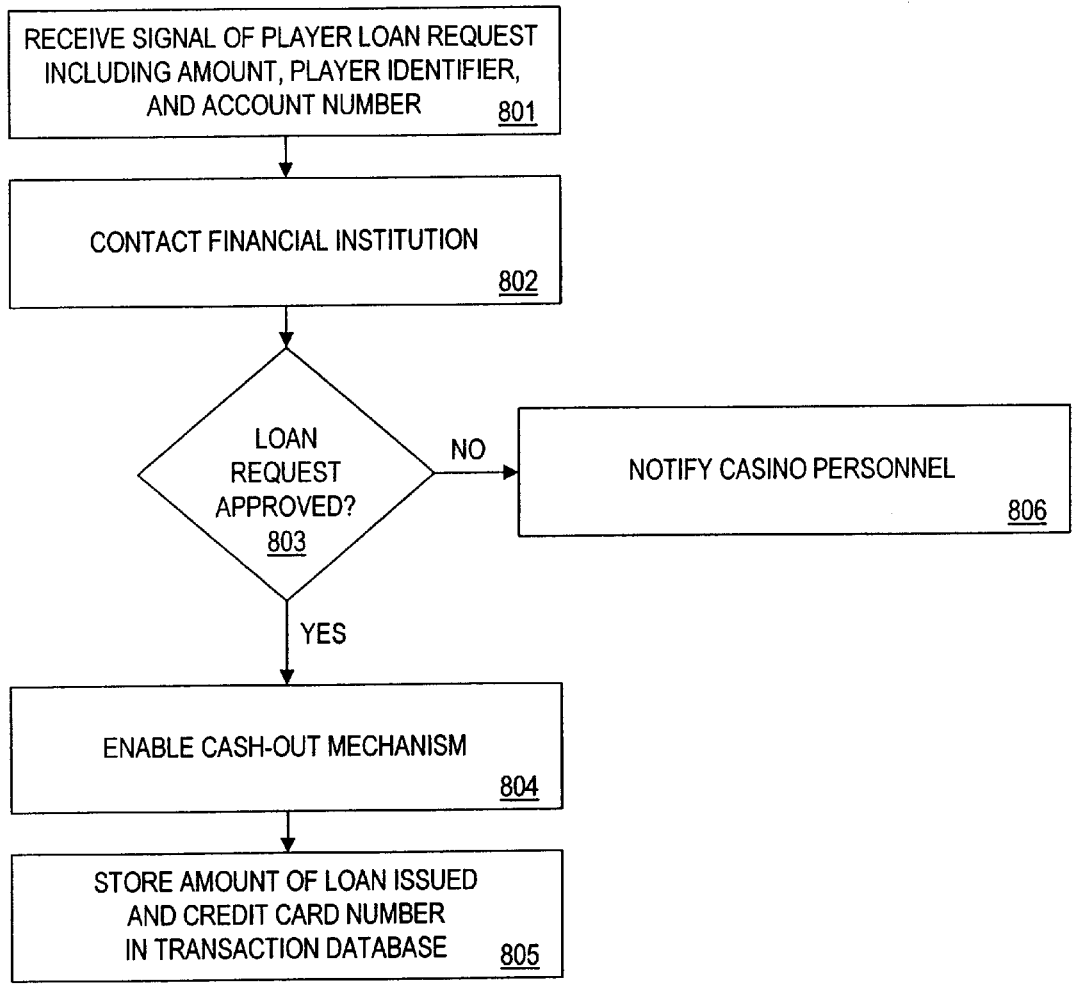
FIG. 8 is a flowchart showing a method for automatic handling of a loan request by the casino server according to another embodiment of the present invention.

The steps followed in this process are shown in the flowchart in FIG. 8. In step 801, the gaming device receives a loan request. The loan request includes the requested amount, the player identifier 401, and the credit card account number 406.

The loan request is transmitted to the server 101, which contacts the player's credit card issuer (or other appropriate financial institution) to obtain account verification and to obtain approval (step 802). The server 101 may query the financial institution to determine if the player has enough credit available on the account to cover the requested amount. If the loan request is approved (step 803), the server 101 directs the gaming device to enable the cash-out mechanism (step 804).

If a credit card account number or debit card account number is provided, the account number 406 is stored in association with the player identifier 401 in the database 314 (step 805). However, the player's account would not be actually charged until the player's session ended. The account may never be charged if the player does not have an amount of loan due that is greater than zero by the end of a game session. The end of a game session may be indicated, for example, when the player presses a cash-out button or removes his player tracking card from the card reader 323.

Alternatively, the server 101 may instruct the financial institution to freeze a part of the player's available credit, in case it is eventually necessary to charge the amount of the loan to the account. For detailed discussion of how the account verification may be performed, please see "Electronic Payment Systems", by Donald O'Mahony, Michael Peirce and Hitesh Tewari, incorporated herein by reference.

As described further below, if the player does not repay the amount of loan due with his winnings, he may have the opportunity to repay at the end of his gaming session. Thus, the player's credit card account need not be charged to repay a loan due.

If the loan request is not approved by the player's financial institution, the gaming device sends a signal to notify casino personnel (step 806) to conduct a loan transaction with the player as described above. Alternatively, the server may direct the gaming device to halt play if the loan request is not automatically approved, thereby minimizing risk for the casino.

Figure 9:
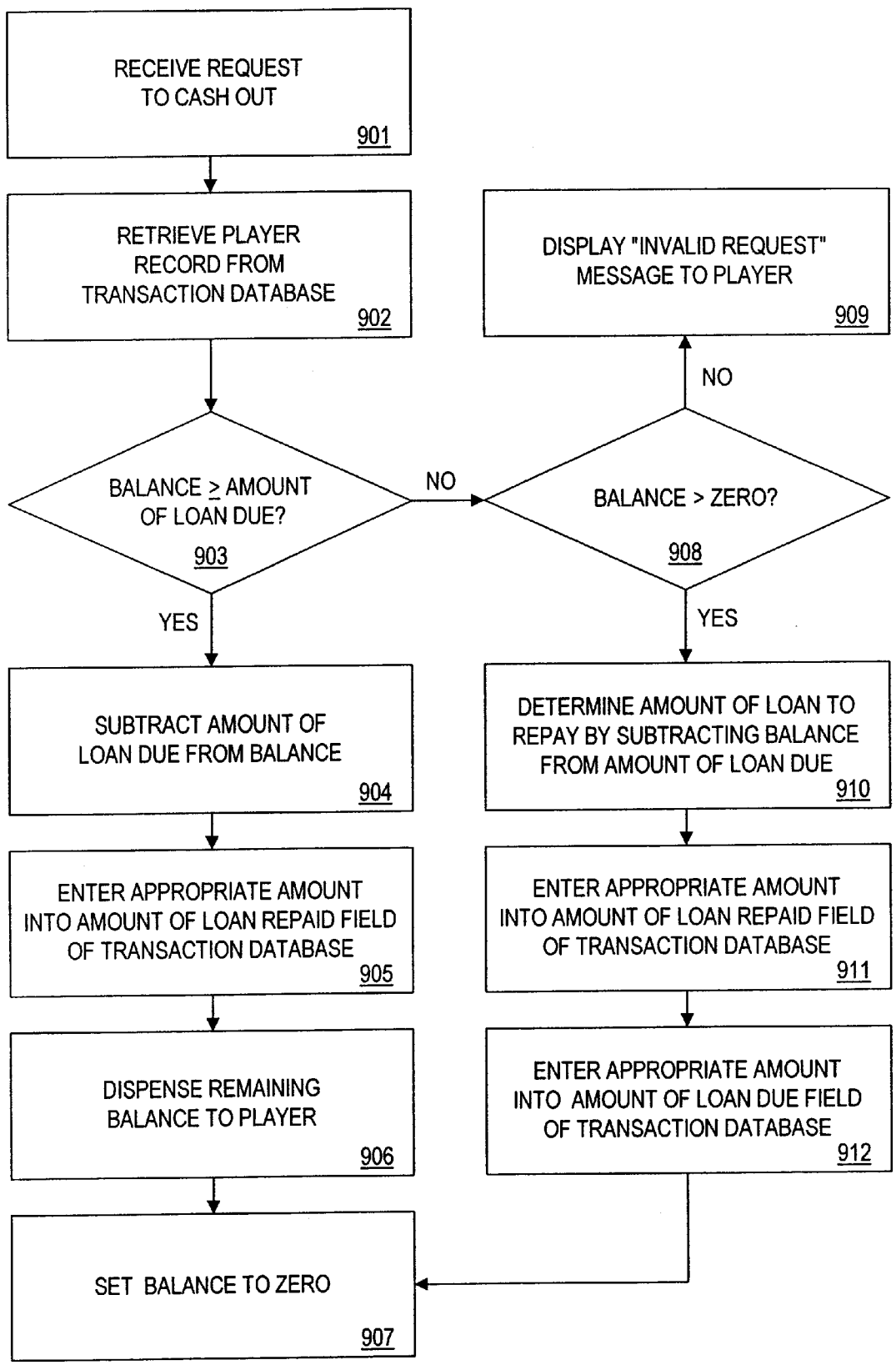
FIG. 9 is a flowchart showing a "cash out" process executed by the gaming device, according to one embodiment of the present invention.

When the player wishes to end his session, he inputs a "cash-out" request to the gaming device using the interface section 320. At this point the player repays the amount of loan due, if any, or collects the difference between winnings and the amount of loan due. The steps involved in this process are shown in the flowchart in FIG. 9.

In step 901, the gaming device receives a request to cash out from the player. The processor 301 then retrieves from the transaction database 314 the record corresponding to the player (step 902). In step 903, the balance of the gaming device is compared with the amount of loan due 405 of the record. If the player won enough money during the session to repay the amount of loan due 405 (i.e. the balance is greater than or equal to the amount of the loan due), the amount of loan due 405 is subtracted from the balance (step 904). The corresponding amount of loan repaid 404 is set equal to the amount of loan issued 403 (step 905) and the amount of loan due is set to zero (step 906).

A signal may be sent to either casino personnel or to the server 101, indicating that the loan amount has been repaid. Any remaining amount in the balance is dispensed to the player (step 906). Finally, the balance is set to zero (step 907).

If the amount of loan issued 403 is greater than the balance of the gaming device, the player must pay the difference. The processor 301 checks whether the balance is greater than zero (step 908). If the balance is zero, the request to cash out is deemed invalid, and a message to that effect is displayed on the gaming device (step 909). The processor 301 determines how much of the amount of loan issued 403 must be repaid, by subtracting the balance therefrom (step 910). The balance is used to partially repay the amount of loan issued 403. The balance is added to the loan repaid field 404 of the database 314 (step 911). The difference between the amount of loan issued 403 and the balance is added to the amount of loan due field 405 of the database 314 (step 912). The balance is then set to zero (step 907).

If the amount of loan due 405 is greater than zero, the player may be given a specified period of time to repay the remainder of the loan at a casino service counter in cash. Alternatively, the player may be given the opportunity to do so directly at the gaming device. If the player does not repay the remainder before this default time limit is reached, the player's credit card may be charged for that remainder. The process for such an alternate method of cashing out is described below with reference to FIG. 10.

Figure 10:
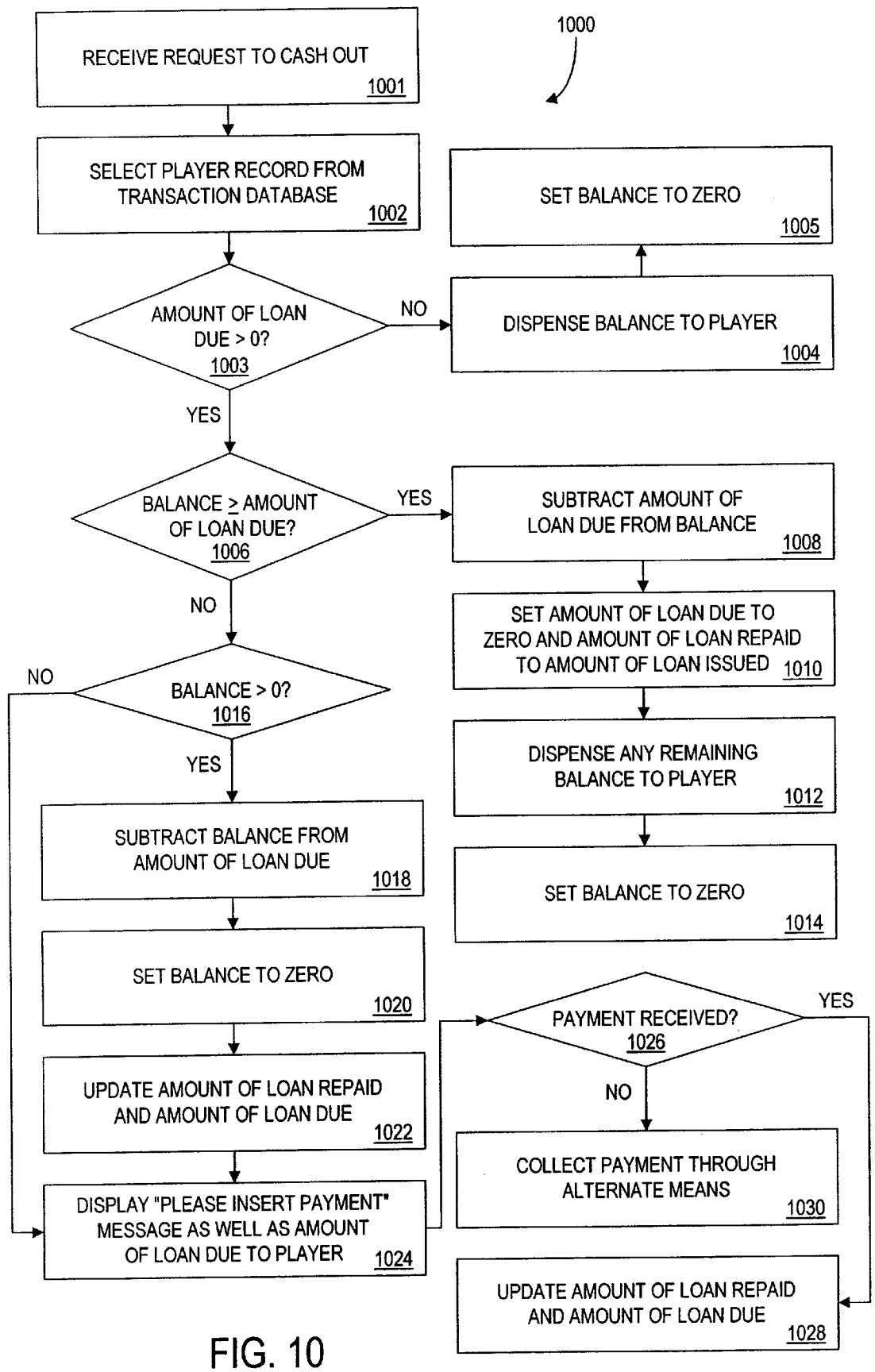
FIG. 10 is a flowchart showing a "cash out" process executed by the gaming device, according to another embodiment of the present invention.

Referring to FIG. 10, a process 1000 performed by the processor 301 (FIG. 3) initiates when a request to cash out is received (step 1001) from a player. The player may request to cash out by actuating a "cash-out" button (not shown) or other appropriate control of the gaming device. Upon receiving the request to cash out, the processor 301 selects from the transaction database 314 (FIGS. 3 and 4) a record corresponding to the player (step 1002). For example, the gaming device may identify the player by a player tracking card inserted therein. The player tracking card would include a player identifier, and thus the record identified by the appropriate player identifier would be selected.

The processor 301 determines whether the amount of loan due 405 (FIG. 4) of the selected record is greater than zero (step 1003). If the amount of loan due 405 is not greater than zero (i.e. the player has no amount to repay), then the processor 301 directs the hopper controller 304 (FIG. 3) to dispense the balance of the gaming device to the player (step 1004). For example, the processor 301 may direct the hopper controller 304 to in turn direct the hopper 305 (FIG. 3) to dispense coins into a coin tray (not shown) of the gaming device. The processor 301 then sets the balance of the gaming device to zero (step 1005).

If, in step 1003 the processor 301 determines that the amount of loan due 405 of the selected record is greater than zero, then the processor 301 determines whether the balance is greater than or equal to the amount of loan due 405 (step 1006). This enables the processor 301 to determine whether the balance may be used to repay all of the amount of loan due 405. If the balance is greater than or equal to the amount of loan due 405, any existing balance is used to repay the amount of loan repaid 405. In particular, the processor 301 subtracts the amount of loan due 405 from the balance (step 1008), sets the amount of loan due 405 to zero and sets the amount of loan repaid 404 to the amount of loan issued (step 1010), dispenses any remaining balance to the player (step 1012), and sets the balance to equal zero (step 1014). As described above, the amount of loan issued may be calculated by summing the amount of loan repaid and the amount of loan due.

For example, if the amount of loan repaid 404 is $15, the amount of loan due 405 is $10, and the balance is $35, then the processor 301 may subtract the $10 from the balance (in accordance with step 1008) to yield a remaining balance of $25. The processor 301 then, in accordance with step 1010, sets the amount of loan due 405 to $0, and sets the amount of loan repaid 404 to $25 ($25=$15+$10). The processor then directs the hopper controller 304 (FIG. 3) to dispense the remaining balance, and set the balance to zero, in accordance with steps 1012 and 1014 respectively.

In an alternate embodiment, the gaming device may display to the player a message requesting the player's permission to use the existing balance to repay the amount of loan due 405. Such a message may be displayed via the video display 306 (FIG. 3), and would typically be displayed before step 1008. The player may respond to the message by actuating a key on keypad 322 (FIG. 3). For example, the player may wish to have his entire balance dispensed to him for use in other gambling activities and have the amount of loan due 405 charged to his credit card account.

If the processor 301, in step 1006, determines that the balance is not greater than or equal to the amount of loan due 405, then the processor 301 determines whether the balance is greater than zero (step 1016). If the balance is greater than zero, the processor 301 uses the balance to repay a portion of the loan amount due. The processor 301 subtracts the balance from the amount of loan due (step 1018), sets the balance to zero (step 1020), and updates the amount of loan repaid 404 and the amount of loan due 405 to reflect the adjustment (step 1022), in a manner similar to that described above.

The processor 301 then prompts the player to provide an additional payment amount equal to the amount of loan due 405 (step 1024). The player thus has the opportunity to repay the remainder of the loan amount without having a charge applied to his credit card account. If the player provides the additional payment amount (step 1026), the processor 301 updates the amount of loan repaid 404 and amount of loan due 405 (step 1028). In other words, the amount of loan repaid 404 is set equal to the amount of loan issued 403 and the amount of loan due 405 is set to zero. If the additional payment amount is not received from the player, the additional payment amount is collected through alternate means (step 1030). Collecting the additional payment amount through alternate means may comprise charging the player's credit card account for the additional payment amount. In some embodiments there may be a time limit associated with how long the player has to provide the additional payment amount before the payment is collected through alternate means.

It will be understood by one of ordinary skill in the art that although the above-described method steps were described with reference to updating information stored in the transaction database 314, similar method steps could be adapted to update information stored in the registered casino hotel guests database 212. Such an adaptation may be desirable in an alternate embodiment where automatic approval of a loan request is based on whether the player is a registered casino hotel guest. In that embodiment, the step 1030 of collecting payment may comprise charging the amount of loan due 405 to the player's casino hotel bill.

In an embodiment where an automatic approval of the loan request is done by determining whether the player is a registered casino hotel guest, the gaming device communicates with the server 101 to update the amount of loan repaid field 404 and the amount of the loan due field 405 of registered casino hotel guests database 212, as well as the corresponding fields of the transaction database 314 (FIGS. 3 and 4).

In the case of the alternate embodiment where approval is automated and a portion of the player's available credit on a credit card account is frozen, the gaming device would communicate with the server. The gaming device would signal the server the amount of the loan that has been repaid. The server 101 would then contact the financial institution to charge the player's credit card account for the difference. Alternatively, if the player were to obtain cash (for example, from an ATM machine) to repay the amount of the loan, he may be given an opportunity to do so, so that his credit card account would not be charged.

Figure 11A:
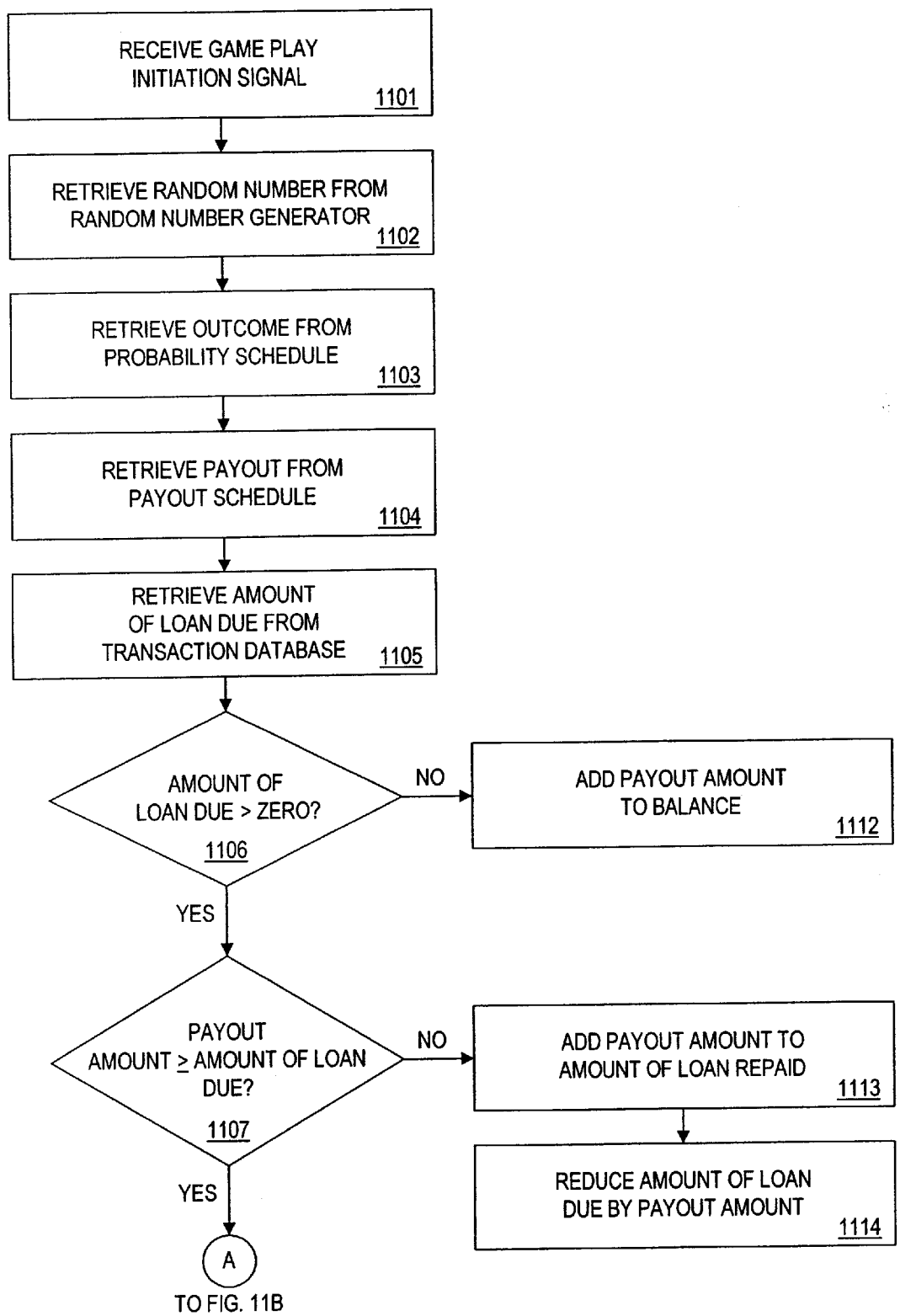
FIGS. 11A and 11B depict a flowchart showing a method for adjusting the player's balance in accordance with the result of play of the gaming device.
Figure 11B:
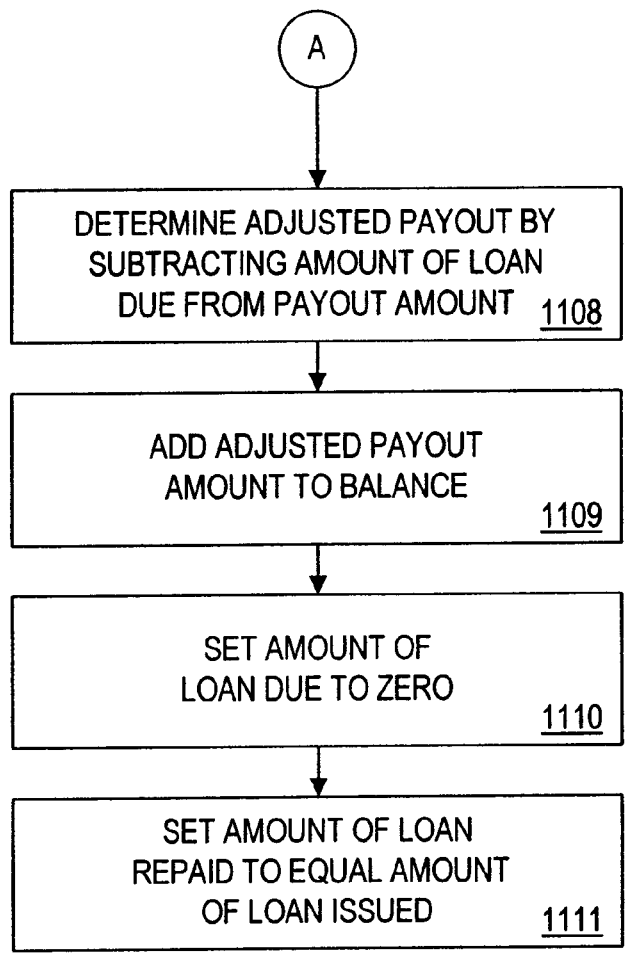

FIGS. 11A and 11B depict a flowchart showing details of the game play process executed by the gaming device. In step 1101, the gaming device receives a play initiation signal from the player. The processor 301 receives a random number from the random number generator 307 (step 1102), and retrieves the outcome of play from the probability schedule 313 (step 1103). The processor then retrieves the payout amount from the payout schedule 312 (step 1104).

Payouts associated with the player's winning combinations are applied to the amount of the loan repaid 404 until the entire amount of the loan has been repaid. In step 1105, the processor 301 retrieves the amount of loan due 405 from the transaction database 314. The processor 301 determines whether the amount of loan due 405 is greater than zero (step 1106), and if so, whether the payout amount is greater than or equal to the amount of loan due 405 (step 1107).

If the payout is sufficient to equal or exceed the amount of loan due 405, the payout is adjusted by subtracting therefrom the amount of the loan due (step 1108). The difference (the adjusted payout amount) is added to the balance of the gaming device in step 1109. The amount of loan due is then set to zero (step 1110), and the amount of loan repaid 404 is set equal to the amount of loan issued 403 (step 1111). Since the amount of loan due has been reduced to zero, any additional winnings will then be added to the balance of the gaming device (step 1112). In an embodiment where a casino employee is alerted by a signal to provide the player with paperwork, a loan request may be canceled by the gaming device if the loan request remains outstanding after the amount of loan due is then set to zero.

If the payout amount is not sufficient to fully repay the amount of loan due, the entire payout amount is added to the amount of loan repaid 404 (step 1113). The amount of loan due 405 is reduced accordingly (step 1114).

An exemplary gaming session using one embodiment of the present invention might proceed as follows. A player sits down at a slot machine and requests a $100 balance without providing any payment. He starts playing immediately with a $100 balance established by the $100 loan request. The cash-out mechanism is disabled to prevent the player from taking the winnings without paying. A signal is sent out to a casino employee, who arrives a few minutes later with the necessary forms to approve the loan request. After the player signs the paperwork, the casino employee enters an authorization code into the machine to enable the cash-out mechanism on the slot machine.

In the alternative embodiment where loan requests are automatically approved for hotel guests, the player might request the $100 balance after having his player tracking card read. The system adds the $100 requested amount to the balance of the slot machine to thereby establish a $100 loan, and disables the cash-out mechanism. The system automatically checks if the player is a registered casino hotel guest. If so, the system prompts the player to input his room number and checks that against the room number associated with the player in the registered casino hotel guests database 212 (FIGS. 2 and 5). If the room number matches, the system records the requested amount of the loan in the registered casino hotel guests database 212 and enables the cash-out mechanism. If the room number the player inputted does not match, he may be given another chance to input a valid room number or have an "invalid room number" message displayed to him. If the player repays the $100 loan, or any part of it, the repaid amount is also recorded in the database. Any amount of the loan due is added to the player's hotel bill.

Details of the game play process, in which the payout is applied against the amount of loan due, may be further illustrated by the following example. The player requests a $20 loan when sitting down at a slot machine. The $20 is added to the balance of the slot machine. The player wagers $1 for a single game play. The $1 is deducted from the balance, decreasing it to $19. The game results in a winning outcome, with an associated payout of $5. The $5 payout is used to repay part of the original $20 loan. This partial repayment could be stored in the storage device 310 of the gaming device. Alternatively, a signal indicating the repaid amount could be sent to the server 101 or to casino personnel. The balance remains at $19, since the payout was instead used to repay a portion of the amount of loan issued. The player wagers another $1 on a subsequent game. The $1 is subtracted from the balance, resulting in a balance of $18. The game results in a winning outcome, with an associated payout of $15. The $15 payout is used to repay the amount of loan issued in the manner described above. If the previous $5 repayment was stored in memory, the $15 payout is added to the previous $5, resulting in a sum of $20 which is the amount of loan repaid.

Once the slot machine determines that the player has won enough to repay the amount of loan issued, it may send a signal to the server or casino personnel communicating the same. Any subsequent payouts the player receives for winning game outcomes are added to the balance in the conventional manner.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A gaming device operation method, comprising the steps of:

receiving a loan request including a requested amount;

sending a request signal communicating the loan request;

receiving an approval signal regarding approval of the loan request;

establishing a balance that is not greater than the requested amount; and enabling a cash-out mechanism of the gaming device by a signal included with the approval signal.

2. A method according to claim 1, wherein the step of establishing a balance comprises:

establishing a balance that is equal to the requested amount.

3. A method according to claim 1, further comprising:

determining an amount of loan issued that is less than the requested amount; and reducing the balance by an amount equal to the difference between the requested amount and the amount of loan issued.

4. A method according to claim 1, wherein the loan request includes a player identifier.

5. A method according to claim 4, wherein the step of establishing a balance comprises:

establishing a balance in dependence on the player identifier.

6. A method according to claim 1, further comprising the step of enabling play of the gaming device by the player.

7. A method according to claim 6, wherein the balance is established and play of the gaming device is enabled before the approval signal is received.

8. A method according to claim 6, wherein the step of enabling play of the gaming device further comprises disabling the cash-out mechanism of the gaming device.

9. A method according to claim 1, further comprising the step of adjusting the balance in accordance with an outcome of play of the gaming device.

10. A method according to claim 1, in which the step of receiving an approval signal regarding approval of the loan request comprises:

receiving a signal representing an authorization code.

11. A method according to claim 10, in which the step of enabling a cash-out mechanism comprises:

enabling the cash-out mechanism if the authorization code corresponds to a predetermined code.

12. A method according to claim 1, further comprising the steps of determining an amount of loan issued based on the requested amount and the approval signal;

determining an amount of loan due based on the amount of loan issued; and adjusting the amount of loan due based on an outcome of play of the gaming device.

13. A method according to claim 12, further comprising the step of determining an amount of loan repaid based on the adjusted amount of loan due.

14. A method of approving a loan request from a gaming device, the method comprising the steps of:

receiving a loan request signal from a gaming device, the loan request signal representing a loan request; and sending to the gaming device a signal indicating approval of the loan request, wherein the loan request signal includes a requested amount, and the signal indicating approval of credit includes a signal enabling a cash-out mechanism of the gaming device.

15. A method according to claim 14, further comprising the step of:

charging a credit card account by the requested amount.

16. A method according to claim 14, further comprising the step of:

adjusting the credit card account in accordance with an outcome of play of the gaming device.

17. A method according to claim 14, further comprising the steps of:

determining whether the player has an account chargeable by an operator of the gaming device, based upon the player identifier; and charging the account by the requested amount.

18. A method according to claim 17, further comprising the step of:

adjusting the account in accordance with an outcome of play of the gaming device.

19. A method according to claim 14, wherein the loan request signal is received and the signal indicating approval of the loan request is sent by an operator of the gaming device.

20. A gaming device operation method, comprising the steps of:

receiving a loan request including a requested amount at a gaming device;

sending a first signal to a controller of the gaming device communicating the loan request;

receiving at the controller the first signal from the gaming device;

sending a second signal to the gaming device indicating approval of the loan request;

receiving at the gaming device the second signal from the controller of the gaming device;

establishing a balance available to the player in accordance with the second signal, the balance being not greater than the requested amount;

enabling play of the gaming device by the player; and adjusting the balance in accordance with an outcome of the play of the gaming device, wherein the second signal includes a signal enabling a cash-out mechanism of the gaming device.

21. A method according to claim 20, wherein the play of the gaming device is enabled before the second signal is received.

22. A gaming device apparatus, comprising:

a storage device; and a processor connected to the storage device, the storage device storing a program for controlling the processor; and the processor operative with the program to:

receive a loan request including a requested amount;

send a request signal communicating the loan request;

receive an approval signal regarding approval of the loan request;

establish a balance that is not greater than the requested amount; and enable a cash-out mechanism of the gaming device by a signal included with the approval signal.

23. A computer readable medium encoded with processing instructions for implement a gaming device operation method, the method comprising the steps of:

receiving a loan request including a requested amount;

sending a request signal communicating the loan request;

receiving an approval signal regarding approval of the loan request;

establishing a balance that is not greater than the requested amount; and enabling a cash-out mechanism of the gaming device by a signal included with the approval signal.

24. An apparatus for approving a loan request from a gaming device, comprising:

a storage device; and a processor connected to the storage device, the storage device storing a program for controlling the processor; and the processor operative with the program to:

receive a loan request signal from a gaming device, the loan request signal representing a loan request; and send to the gaming device a signal indicating approval of the loan request, wherein the loan request signal includes a requested amount, and the signal indicating approval of credit includes a signal enabling a cash-out mechanism of the gaming device.

25. A computer readable medium encoded with processing instructions for implementing a method of approving a loan request from a gaming device, the method comprising the steps of:

receiving a loan request signal from a gaming device, the loan request signal representing a loan request; and sending to the gaming device a signal indicating approval of the loan request, wherein the loan request signal includes a requested amount, and the signal indicating approval of credit includes a signal enabling a cash-out mechanism of the gaming device.

26. A gaming device apparatus, comprising:

a storage device; and a processor connected to the storage device, the storage device storing a program for controlling the processor; and the processor operative with the program to:
receive a loan request including a requested amount at a gaming device;
send a first signal to a controller of the gaming device communicating the loan request;
receive at the controller the first signal from the gaming device;
send a second signal to the gaming device indicating approval of the loan request;
receive at the gaming device the second signal from the controller of the gaming device;
establish a balance available to the player in accordance with the second signal, the balance being not greater than the requested amount;
enable play of the gaming device by the player; and
adjust the balance in accordance with an outcome of the play of the gaming device,
wherein the second signal includes a signal enabling a cash-out mechanism of the gaming device.

27. A computer readable medium encoded with processing instructions for implementing a gaming device operation method, the method comprising the steps of:

receiving a loan request including a requested amount at a gaming device;

sending a first signal to a controller of the gaming device communicating the loan request;

receiving at the controller the first signal from the gaming device;

sending a second signal to the gaming device indicating approval of the loan request;

receiving at the gaming device the second signal from the controller of the gaming device;

establishing a balance available to the player in accordance with the second signal, the balance being not greater than the requested amount;

enabling play of the gaming device by the player; and adjusting the balance in accordance with an outcome of the play of the gaming device, wherein the second signal includes a signal enabling a cash-out mechanism of the gaming device.

* * * * *